(12) United States Patent
McMullen (10) Patent No.: US 10,447,111 B2
(45) Date of Patent: Oct. 15, 2019

(54) ACTIVE MAGNETIC BEARING CONTROL FOR DOWNHOLE-TYPE SYSTEM

(71) Applicant: Upwing Energy, LLC, Cerritos, CA (US)

(72) Inventor: Patrick McMullen, Villa Park, CA (US)

(73) Assignee: Upwing Energy, LLC, Cerritos, CA (US)

( * ) Notice: Subject to any disclaimer, the term of this patent is extended or adjusted under 35 U.S.C. 154(b) by 97 days.

(21) Appl. No.: 15/857,524

(22) Filed: Dec. 28, 2017

(65) Prior Publication Data

US 2019/0085669 A1 Mar. 21, 2019

Related U.S. Application Data

(60) Provisional application No. 62/561,067, filed on Sep. 20, 2017.

(51) Int. Cl.
*E21B 17/02* (2006.01)
*E21B 4/04* (2006.01)
(Continued)

(52) U.S. Cl.
CPC .............. *H02K 7/09* (2013.01); *E21B 4/003* (2013.01); *E21B 4/02* (2013.01); *E21B 4/04* (2013.01);
(Continued)

(58) Field of Classification Search
CPC .......... E21B 4/04; E21B 17/028; E21B 47/09; F16C 32/0476
See application file for complete search history.

(56) References Cited

U.S. PATENT DOCUMENTS 5,572,079 A * 11/1996 Pinkerton ........... F16C 32/0444
310/90.5
6,664,680 B1 * 12/2003 Gabrys ............... F16C 32/0444
310/74
(Continued)

FOREIGN PATENT DOCUMENTS

EP 2933512 10/2015
GB 2501352 B 11/2017
(Continued)

OTHER PUBLICATIONS

PCT International Search Report and Written Opinion issued in International Application No. PCT/US2018/051891 dated Mar. 15, 2019, 16 pages.

*Primary Examiner* — Shane Bomar
(74) *Attorney, Agent, or Firm* — Fish & Richardson P.C.

(57) ABSTRACT

A downhole-type system includes a rotatable shaft, a downhole-type magnetic bearing coupled to the rotatable shaft, a downhole-type sensor, a surface-type controller, and a surface-type amplifier coupled to the magnetic bearing. The magnetic bearing can control levitation of the rotatable shaft. The downhole-type sensor can detect a position of the rotatable shaft in a downhole location and generate a first signal based on the detected position. The surface-type controller can receive the first signal, determine an amount of force to apply to the shaft, and generate a second signal corresponding to the determined amount of force. The surface-type amplifier can receive the second signal, amplify the second signal to a sufficient level to drive the magnetic bearing to apply force to the rotatable shaft to control the levitation of the rotatable shaft at the downhole location, and transmit the amplified second signal to the magnetic bearing.

28 Claims, 6 Drawing Sheets

(51) Int. Cl.

| | | |
|---|---|---|
| E21B 47/09 | (2012.01) | |
| F16C 32/04 | (2006.01) | |
| H02K 7/09 | (2006.01) | |
| E21B 43/12 | (2006.01) | |
| E21B 41/00 | (2006.01) | |
| F04D 13/08 | (2006.01) | |
| E21B 4/02 | (2006.01) | |
| H02K 5/132 | (2006.01) | |
| F04D 13/06 | (2006.01) | |
| F04D 13/10 | (2006.01) | |
| E21B 47/01 | (2012.01) | |
| E21B 47/06 | (2012.01) | |
| E21B 47/12 | (2012.01) | |
| F04D 29/041 | (2006.01) | |
| F04D 29/048 | (2006.01) | |
| F16C 37/00 | (2006.01) | |
| E21B 47/00 | (2012.01) | |
| F04B 17/03 | (2006.01) | |
| F04B 47/04 | (2006.01) | |
| H02K 1/27 | (2006.01) | |
| H02K 7/18 | (2006.01) | |
| H02K 11/21 | (2016.01) | |
| H02K 11/27 | (2016.01) | |
| H02K 11/30 | (2016.01) | |
| F04D 29/051 | (2006.01) | |
| H02H 7/00 | (2006.01) | |
| H02K 7/14 | (2006.01) | |
| H02P 29/40 | (2016.01) | |
| H02K 3/42 | (2006.01) | |
| H02K 21/14 | (2006.01) | |
| E21B 4/00 | (2006.01) | |
| F04D 13/02 | (2006.01) | |
| F04D 3/00 | (2006.01) | |
| F04D 29/046 | (2006.01) | |
| G01B 7/14 | (2006.01) | |
| H02K 11/225 | (2016.01) | |
| H02K 11/20 | (2016.01) | |
| F16F 15/03 | (2006.01) | |
| H02K 15/03 | (2006.01) | |
| E21B 33/12 | (2006.01) | |
| H02K 5/128 | (2006.01) | |
| E21B 43/16 | (2006.01) | |
| F04D 29/047 | (2006.01) | |

(52) U.S. Cl.
CPC ........ *E21B 17/028* (2013.01); *E21B 41/0085* (2013.01); *E21B 43/121* (2013.01); *E21B 43/128* (2013.01); *E21B 43/129* (2013.01); *E21B 47/0007* (2013.01); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01); *F04D 3/00* (2013.01); *F04D 13/026* (2013.01); *F04D 13/064* (2013.01); *F04D 13/0633* (2013.01); *F04D 13/08* (2013.01); *F04D 13/086* (2013.01); *F04D 13/10* (2013.01); *F04D 29/041* (2013.01); *F04D 29/046* (2013.01); *F04D 29/048* (2013.01); *F04D 29/051* (2013.01); *F16C 32/0402* (2013.01); *F16C 32/044* (2013.01); *F16C 32/0406* (2013.01); *F16C 32/048* (2013.01); *F16C 32/0444* (2013.01); *F16C 32/0446* (2013.01); *F16C 32/0451* (2013.01); *F16C 32/0455* (2013.01); *F16C 32/0457* (2013.01); *F16C 32/0474* (2013.01); *F16C 32/0476* (2013.01); *F16C 32/0489* (2013.01); *F16C 37/005* (2013.01); *G01B 7/14* (2013.01); *H02H 7/005* (2013.01); *H02K 1/2793* (2013.01); *H02K 3/42* (2013.01); *H02K 5/132* (2013.01); *H02K 7/14* (2013.01); *H02K 7/1807* (2013.01); *H02K 11/20* (2016.01); *H02K 11/21* (2016.01); *H02K 11/225* (2016.01); *H02K 11/27* (2016.01); *H02K 11/30* (2016.01); *H02K 21/14* (2013.01); *H02P 29/40* (2016.02); *E21B 33/12* (2013.01); *E21B 43/168* (2013.01); *E21B 47/065* (2013.01); *F04D 29/0473* (2013.01); *F16C 2352/00* (2013.01); *F16C 2360/44* (2013.01); *F16C 2380/26* (2013.01); *F16F 15/03* (2013.01); *H02K 5/128* (2013.01); *H02K 15/03* (2013.01); *H02K 2201/12* (2013.01); *H02K 2205/03* (2013.01)

(56) References Cited

U.S. PATENT DOCUMENTS

| | | | |
|---|---|---|---|
| 9,583,991 B2* | 2/2017 | Iannello | H02K 7/09 |
| 2002/0184905 A1* | 12/2002 | Benedict | F04D 27/0284 |
| | | | 62/228.4 |
| 2004/0263011 A1* | 12/2004 | Barada | F16C 32/0451 |
| | | | 310/90.5 |
| 2007/0278884 A1 | 12/2007 | Kozaki et al. | |
| 2008/0054741 A1* | 3/2008 | Oyama | F16C 32/0444 |
| | | | 310/68 A |
| 2008/0073993 A1* | 3/2008 | Sortore | F16C 32/0459 |
| | | | 310/90.5 |
| 2012/0063918 A1* | 3/2012 | de Larminat | F16C 19/52 |
| | | | 417/1 |
| 2014/0326509 A1* | 11/2014 | Hay | E21B 17/003 |
| | | | 175/57 |
| 2015/0114632 A1 | 4/2015 | Romer et al. | |
| 2017/0298985 A1* | 10/2017 | Brakensiek | H02K 11/30 |
| 2018/0179860 A1* | 6/2018 | McMullen | H02P 27/04 |
| 2018/0183377 A1* | 6/2018 | McMullen | H02P 27/04 |

FOREIGN PATENT DOCUMENTS

| | | |
|---|---|---|
| JP | 3283693 | 5/2002 |
| WO | WO2014042630 | 3/2014 |

\* cited by examiner

ACTIVE MAGNETIC BEARING CONTROL FOR DOWNHOLE-TYPE SYSTEM

CROSS-REFERENCE TO RELATED APPLICATIONS

This application claims the benefit under 35 U.S.C. § 119(e) of U.S. Patent Application No. 62/561,067, entitled "Sealless Downhole System with Magnetically Supported Rotor," filed Sep. 20, 2017 (Attorney Docket No. 45156-0002P01), which is incorporated herein by reference in its entirety.

TECHNICAL FIELD

This application relates to downhole-type artificial lift systems.

BACKGROUND

Most wells behave characteristically different over time due to geophysical, physical, and chemical changes in the subterranean reservoir that feeds the well. For example, it is common for well production to decline. This decline in production can be due to declining pressures in the reservoir, and can eventually reach a point where there is not enough pressure in the reservoir to economically realize production through the well to the surface. In some instances, a top side pump or compressor is used to extend the life of the well by decreasing pressure at the top of the well. In some instances, a downhole-type artificial lift system, such as an electric submersible pump or compressor, is used to extend the life of the well by increasing pressure within the well.

SUMMARY

This disclosure describes technologies relating to downhole-type systems with a magnetically supported rotor.

An example implementation of the subject matter described within this disclosure is a downhole-type system with the following features. The system includes a rotatable shaft, a downhole-type magnetic bearing coupled to the rotatable shaft, a downhole-type sensor, a surface-type controller, and a surface-type amplifier coupled to the magnetic bearing. The magnetic bearing controls levitation of the rotatable shaft by applying force to the rotatable shaft. The downhole-type sensor detects a position of the rotatable shaft in a downhole location and generate, at the downhole location, a first signal based on the detected position. The surface-type controller receives, at a surface, the first signal generated by the sensor; determines, at the surface, an amount of force to apply to the shaft to maintain levitation of the shaft; and generates, at the surface, a second signal corresponding to the determined amount of force. The surface-type amplifier receives, at the surface, the second signal from the controller; amplifies, at the surface, the second signal to a sufficient level to drive the magnetic bearing to apply force to the rotatable shaft to control the levitation of the rotatable shaft at the downhole location; and transmits, to the downhole location, the amplified second signal to the magnetic bearing.

Aspects of the example implementation, which can be combined with the example implementation alone or in combination, include the following.

The sensor and the magnetic bearing can be lubricant-free.

The downhole location can be more than 500 meters (m) away from the surface.

The magnetic bearing can control axial levitation of the rotatable shaft.

The magnetic bearing can control radial levitation of the rotatable shaft.

The magnetic bearing can control levitation of the rotatable shaft along one axis of the rotatable shaft.

The magnetic bearing can control levitation of the rotatable shaft along multiple axes of the rotatable shaft.

The system can operate during rotation of the shaft.

The sensor and the magnetic bearing can be submerged in fluids present in the downhole location.

The sensor can be an inductive sensor, an eddy current sensor, or a capacitive sensor.

The sensor can generate and transmit the first signal at a rate on the order of a signal every 50 microseconds or faster.

The sensor can include a converter that can convert the first signal into a transmittable digital signal or a transmittable analog signal.

The magnetic bearing can include an actuator surrounding the shaft and a target surrounding the shaft, in which the actuator can generate a magnetic field in response to receiving an electric current, and the target can impart a force on the shaft in response to the generated magnetic field.

The sensor and the actuator of the magnetic bearing are not sealed from the downhole location.

The sensor can include a generator that can generate a voltage signal based on the detected position.

The sensor can include a converter that can convert the voltage signal into a digital signal.

Another example implementation of the subject matter described within this disclosure is a method that includes determining, at a downhole location, a position of a rotating shaft of a downhole-type system, in which the rotating shaft is levitated by a magnetic bearing; transmitting, from the downhole location to a surface, a first signal corresponding to the determined position; determining, at the surface, an amount of force to apply to the shaft to maintain the levitation of the rotating shaft at the downhole location; generating, at the surface, a second signal corresponding to the amount of force; amplifying, at the surface, the second signal to a sufficient level to drive the magnetic bearing to control the levitation of the rotatable shaft at the downhole location; and transmitting, to the downhole location, the amplified second signal to the magnetic bearing.

Aspects of the example implementation, which can be combined with the example implementation alone or in combination, include the following.

The method can include filtering the second signal to compensate for capacitance and inductance in a transmission cable.

The magnetic bearing can maintain axial levitation of the rotating shaft.

The magnetic bearing can maintain radial levitation of the rotating shaft.

The magnetic bearing can maintain levitation of the rotating shaft along one axis of the rotating shaft.

The magnetic bearing can maintain levitation of the rotating shaft along multiple axes of the rotating shaft.

The downhole location can be more than 500 m away from the surface.

Transmitting the first signal can occur at a rate on the order of a signal every 50 microseconds or faster.

The method can include generating a magnetic field in response to receiving an electric current and generating a force on the shaft in response to the generated magnetic field.

Generating the force can occur within 50 milliseconds after transmitting the first signal.

Transmitting the first signal can include generating a voltage signal based on the determined position.

Transmitting the first signal can include converting the generated voltage signal into a digital signal.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shutdown" or "killed" to prevent fluid flowing to the surface that can cause damage or injury, a very costly process not only in performing the work but also in lost production and risk in damaging the well where further production is jeopardized.

While all these issues and risk exist, the potential benefit of well intervention with production enhancing tools and measurement equipment is a prevalent industry because of the enhanced production it can offer. While these benefits have been demonstrated, reliability and robustness of equipment in this harsh environment is not close to conventional topside mounted equipment. The described technology can improve reliability and robustness of such equipment by utilizing a magnetic bearing system for rotor support (a magnetic thrust bearing for thrust support and a magnetic radial bearing for radial support), a high speed permanent magnet motor for torque, a sensor-less long distance variable frequency drive, magnetic bearing controls, and advanced fluid compression and pump configuration. The use of the radial magnetic bearing system, thrust magnetic bearing system, and permanent magnet electric machine allow for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 mm in size. The clearances also allow for integration of an isolation barrier to allow operation independent of the environment and not requiring any lubricants or cooling that may reduce system efficiency and performance. The use of these systems can also provide operational data for the well currently unavailable, or only available with additional sensor systems. For example, the sensor-less variable frequency drive can provide data on operating temperature and fluid properties through its operating requirements. Or another example is an active thrust bearing can provide data on operating pressure during operation and liquid/gas content in the well. The device consists of only high temperature components to allow survival in high temperature environments present in deep wells. The device can utilize fully isolated rotor and stator parts to protect any materials and components that would be adversely affected by the process fluids. This provides the isolation for allowing the process fluid to flow into and through the motor and bearings.

Active magnetic bearing systems can offer advantages in certain applications over conventional mechanical bearings, air bearings, or passive magnetic bearings. Active magnetic bearings do not require lubrication, can operate in a variety of environments in which typical lubricated bearings have difficulty operating (such as vacuum conditions or in the presence of sour gas or contaminated oil). The performance of active magnetic bearings is adjustable using a controller programmed in software (within the load ratings of the actuators of the magnetic bearings), whereas mechanical bearings require a mechanical change in hardware to provide a change in performance and/or response. A control loop (maintained, for example, by a controller) operates active magnetic bearings, as the actuators of active magnetic bearings are not passively stable.

Downhole devices typically operate in harsh environments constrained by the casing diameter installed in a drilled well. The process fluids present in the well are typically caustic on materials and can degrade equipment operation over the lifetime of the well. Lubrication for mechanical bearings can be quickly lost as the process fluids flow through the downhole devices, rendering the mechanical bearings unusable. Conventional approaches, for example, employed on electrical submersible pumps, include creating a chamber of clean oil for the mechanical bearings to operate on. The chamber is kept relatively clean by a labyrinth seal, but over time, process fluids can contaminate the oil, which can result in bearing failure.

In contrast, magnetic bearings can be isolated from the downhole environment or optionally operated within the downhole environment, exposed to the process liquids, if the components are compatible. Downhole-type devices can use active magnetic bearing systems that do not require lubrication and can operate flooded in the process fluid. For sealed systems (such as a motor for an electrical submersible pump), the downhole device does not need to be flooded in liquid to operate, which can significantly reduce drag losses on the motor and therefore increase pumping efficiency. Magnetic bearings also impose minimal losses. Therefore, the use of active magnetic bearing systems in downhole devices can increase the relative torque output for an equivalently sized motor, or reduce size and power requirements for the same shaft torque output.

Figure 1:
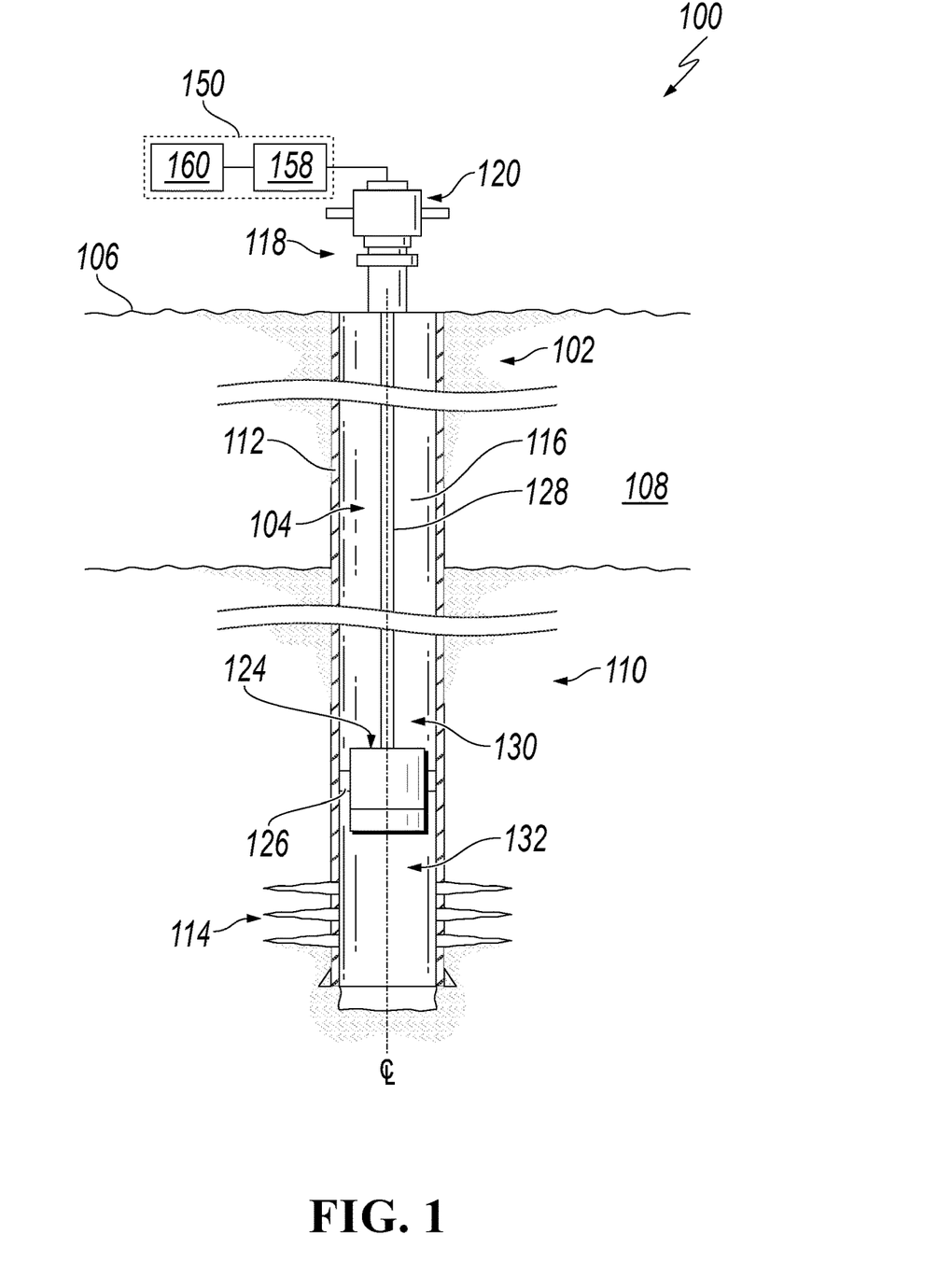
FIG. 1 is a schematic side view of an example well system.

FIG. 1 depicts an example well system 100 constructed in accordance with the concepts herein. The well system 100 includes a well 102 having a wellbore 104 that extends from the surface 106 through the Earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth 108 defining a reservoir, but in other instances, the zone 110 can be multiple formations or a portion of a formation. For simplicity's sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadedly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

The well system 100 also includes a downhole-type system 124 residing in the wellbore 104, for example, at a depth that is nearer to subterranean zone 110 than the surface 106. The downhole-type system 124, being of a type configured in size and robust construction for installation within a well 102, can be any type of rotating equipment that can assist production of fluids to the surface 106 and out of the well 102 by creating an additional pressure differential within the well 102. For example, the downhole-type system 124 can be a pump, compressor, blower, or multi-phase fluid flow aid. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type system 124 can be configured to fit in, and (as discussed in more detail below) in certain instances, seal to the inner diameter of one of the specified API casing sizes. Of course, the downhole-type system 124 can be made to fit in and, in certain instances, seal to other sizes of casing or tubing or otherwise seal to the wall of the wellbore 104.

Additionally, as a downhole-type system 124, the construction of its components are configured to withstand the impacts, scraping, and other physical challenges the system 124 will encounter while being passed hundreds of feet/meters or even multiple miles/kilometers into and out of the wellbore 104. For example, the downhole-type system 124 can be disposed in the wellbore 104 at a depth of up to 20,000 feet (6,096 meters). Beyond just a rugged exterior, this encompasses having certain portions of any electronics being ruggedized to be shock resistant and remain fluid tight during such physical challenges and during operation. Additionally, the downhole-type system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type system 124, the system 124 can be configured to interface with one or more of the common deployment systems, such as jointed tubing (i.e., lengths of tubing joined end-to-end, threadedly and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (for example, a jointed tubing connector, coiled tubing connector, or wireline connector). In FIG. 1, the system 124 is shown deployed on wireline 128.

A seal system 126 integrated or provided separately with a downhole system, as shown with the downhole-type system 124, divides the well 102 into an uphole zone 130 above the seal system 126 and a downhole zone 132 below the seal system 126. FIG. 1 shows the downhole-type system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the system 124 creates in the well 102. In some instances, the seal system 126 of the downhole-type system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type system 124 from a pressure in the wellbore 104 uphole of the seal system 126 of the downhole-type system 124. Although FIG. 1 includes both the downhole-type system 124, in other instances, additional components, such as a surface compressor, can be used in conjunction with the system 124 to boost pressure in the well 102.

In some implementations, the downhole-type system 124 can be implemented to alter characteristics of a wellbore by a mechanical intervention at the source. Alternatively, or in addition to any of the other implementations described in this specification, the downhole-type system 124 can be implemented as a high flow, low pressure rotary device for gas flow in sub-atmospheric wells. Alternatively, or in addition to any of the other implementations described in this specification, the downhole-type system 124 can be implemented in a direct well-casing deployment for production through the wellbore. Other implementations of the downhole-type system 124 as a pump, compressor, or multiphase combination of these can be utilized in the well bore to effect increased well production.

The downhole-type system 124 locally alters the pressure, temperature, and/or flow rate conditions of the fluid in the wellbore 104 proximate the system 124 (e.g., at the base of the wellbore 104). In certain instances, the alteration performed by the system 124 can optimize or help in optimizing fluid flow through the wellbore 104. As described above, the downhole-type system 124 creates a pressure differential within the well 102, for example, particularly within the wellbore 104 the system 124 resides in. In some instances, a pressure at the base of the wellbore 104 is a low pressure (e.g., sub-atmospheric); so unassisted fluid flow in the wellbore can be slow or stagnant. In these and other instances, the downhole-type system 124 introduced to the wellbore 104 adjacent the perforations 114 can reduce the pressure in the wellbore 104 near the perforations 114 to induce greater fluid flow from the subterranean zone 110, increase a temperature of the fluid entering the system 124 to reduce condensation from limiting production, and increase a pressure in the wellbore 104 uphole of the system 124 to increase fluid flow to the surface 106.

The downhole-type system 124 moves the fluid at a first pressure downhole of the system 124 to a second, higher pressure uphole of the system 124. The system 124 can operate at and maintain a pressure ratio across the system 124 between the second, higher uphole pressure and the first, downhole pressure in the wellbore. The pressure ratio of the second pressure to the first pressure can also vary, for example, based on an operating speed of the system 124.

The downhole-type system 124 can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The system 124 can operate in above atmospheric wellbore pressures, for example, at wellbore pressure between 14.7 psia (101.3 kPa) and 5,000 psia (34,474 kPa).

The downhole system, shown as the downhole-type system 124, includes a controller system 150. The controller system 150 includes a magnetic bearing controller 160 and an amplifier 158, which in some implementations are located topside to maximize reliability and serviceability. The amplifier 158 can receive a current command signal from the controller 160. The amplifier 158 can amplify the current command signal to a level in scale to drive current to the actuator of the magnetic bearing system, and the actuator can convert the current to a force that is applied to the rotor. As one example, the amplifier 158 can receive a signal that is in a range of (and including) −10 volts to +10 volts from the controller 160, and the amplifier can amplify the signal and output a current that is in a range of (and including) −25 amps to +25 amps (sent to the actuator). Higher or lower currents can be output from the amplifier 158, depending on the gain of the amplifier 158 and other design aspects of the amplifier 158. The amplifier 158 operates as a switching power supply, creating current at the output by applying voltage at the output of the amplifier 158 for varying durations of time. The voltage can be, for example, 200 VDC (volts in direct current), or higher or lower depending on the design of the amplifier 158 and the power supply providing the voltage signal to the amplifier 158. For example, the amplifier 158 can be designed for 200 VDC but operate at 160 VDC due to the available voltage of a rectified 120 VAC (volts in alternating current) signal phase. The amplifier 158 can switch the DC voltage between on and off at varying lengths at frequencies ranging from 10,000 hertz (Hz) to 30,000 Hz (or faster or slower) depending on the design of the amplifier 158.

The controller 160 can be a digital signal processor (DSP) based or analog based controller receives the position signals from a sensor (for example, the sensor 154 shown in FIG. 2) and/or sensor electronics within the downhole-type system 124 and uses this for input as part of its position control algorithm. In some implementations, the controller 160 is a DSP dedicated and designed for controlling a magnetic bearing system of a downhole-type system (such as the bearing system of the downhole-type system 124). In some implementations, the controller 160 is a computer (including one or more processors) that can execute instructions stored in memory in order to perform a variety of operations, including controlling a magnetic bearing system of a downhole-type system (such as the bearing system of the downhole-type system 124). The sensor 154 can detect a position (such as a radial or an axial position) of a rotating shaft and send a signal, which corresponds to the detected position of the rotating shaft, to the controller 160, for example, across a wired connection. The sensor 154 is described in more detail later. The rotor control algorithm output is a current command to the amplifier 158 to drive coils of the active bearings within the downhole-type system 124, thus impacting a force on the rotor (details are explained in greater detail later within the disclosure). This loop typically happens very fast, on the order of 1,000-20,000 times a second depending on the system control requirements. In some cases, the controller 160 is configured to generate and transmit signals at a rate on the order of every 50 microseconds or faster.

The controller 160 is configured to receive (at the surface 106) the first signal generated by the sensor 154 (FIG. 2), determine (at the surface 106) an amount of force to apply to the shaft (that is, rotor) to maintain levitation of the shaft, and generate (at the surface 106) a second signal that corresponds to the determined amount of force. The amplifier 158 is coupled to the magnetic bearing 218 (details are explained in greater detail later within the disclosure) and is configured to receive (at the surface 106) the second signal from the controller 160, amplify (at the surface 106) the second signal to a level that is sufficient to drive the magnetic bearing 218 to apply force to the rotatable shaft in order to control the levitation of the rotatable shaft at the downhole location, and transmit the amplified second signal to the magnetic bearing 218 at the downhole location.

In some implementations, the controller 160 is installed topside (that is, at the surface 106) and connected to sensors (such as the sensor 154) and magnetic bearing actuators with a cable (such as the wireline 128) running from the surface 106 to the device located downhole. In some implementations, the controller 160 is packaged with the sensors 154 and magnetic bearing actuators for installation and deployment downhole. In such cases where the controller 160 is to be deployed downhole, the controller 160 is isolated from the downhole environment, can require cooling, and can benefit from redundancy of various components, such as power drive sections and sensors 154. In some implementations, some components of the controller system 150 are located downhole while some components of the controller 160 are located at the surface 106. For example, the sensor electronics can be deployed downhole with the sensors 154, while the remaining components (such as the controller 160, amplifier 158, and power supply) are located at the surface 106. In some cases, all electronics are located topside (that is, at the surface 106), while in other cases, all electronics are deployed downhole. Some components—such as any critical components that are necessary for the function of the magnetic bearing in levitating the shaft (for example, the amplifier 158)—of the magnetic bearing or the sensor 154 can be configured to be isolated from the fluids present in the downhole location. In some cases, an isolation barrier is used to isolate the sensor 154 and the magnetic bearing (or components of the sensor 154 and the magnetic bearing) from the fluids present in the downhole location. An isolation barrier can, for example, include a this metallic (such as 300 series stainless steel) or carbon-fiber material in the form of a cylindrical can or sheet.

This control system is also capable of interpreting the sensed voltage signals to estimate temperatures and fluid pressures in the well. For example, the controller system 150 can include a component that is sensitive to pressure, such as a diaphragm. The diaphragm can have a reference position and can move (that is, expand or contract) when an internal pressure of the diaphragm is different from an external pressure external to the diaphragm. The diaphragm can expand or contract until the internal pressure within the diaphragm matches the external pressure. The contraction or expansion of the diaphragm can affect a voltage signal to the controller 160. The change in the voltage signal due to the contraction or expansion of the diaphragm can be determined by the controller 160, which can then be used to determine the external pressure (for example, the fluid pressures in the well). In some cases, the controller system 150 can include a temperature-sensitive material. The temperature-sensitive material can have a reference state and can move (that is, expand or contract) with the temperature of the environment surrounding the temperature-sensitive material. Similarly, the contraction or expansion of the temperature-sensitive material can affect a voltage signal to the controller 160. The change in the voltage signal due to the contraction or expansion of the temperature-sensitive material can be determined by the controller 160, which can then be used to determine the temperature of the surrounding environment (for example, the temperature of the downhole location within the well).

An analog circuit based controller can also perform these functions. Having this DSP or analog circuit based controller topside allows for easy communication, service, improved up time for the system, as any issues can be resolved immediately via local or remote support. Downhole electronics are also an option either proximate to the device or at a location more thermally suitable. In a downhole implementation, the electronics can be packaged to isolate them from direct contact with the downhole environment. The sensor and magnetic bearing can be lubricant-free. In some cases, the sensor and magnetic bearing actuator are not packaged or sealed from the downhole environment or location. For example, the sensor and magnetic bearing can be submerged in the downhole fluids that are being extracted from the subterranean zone 110, while the controller 160 and amplifier 158 are located at the surface 106 and not exposed to the downhole fluids. Although shown in FIG. 1 as being located at the surface 106, in some cases, the controller 160 and the amplifier 158 can be packaged downhole with the magnetic bearing actuator and sensor.

Figure 2:
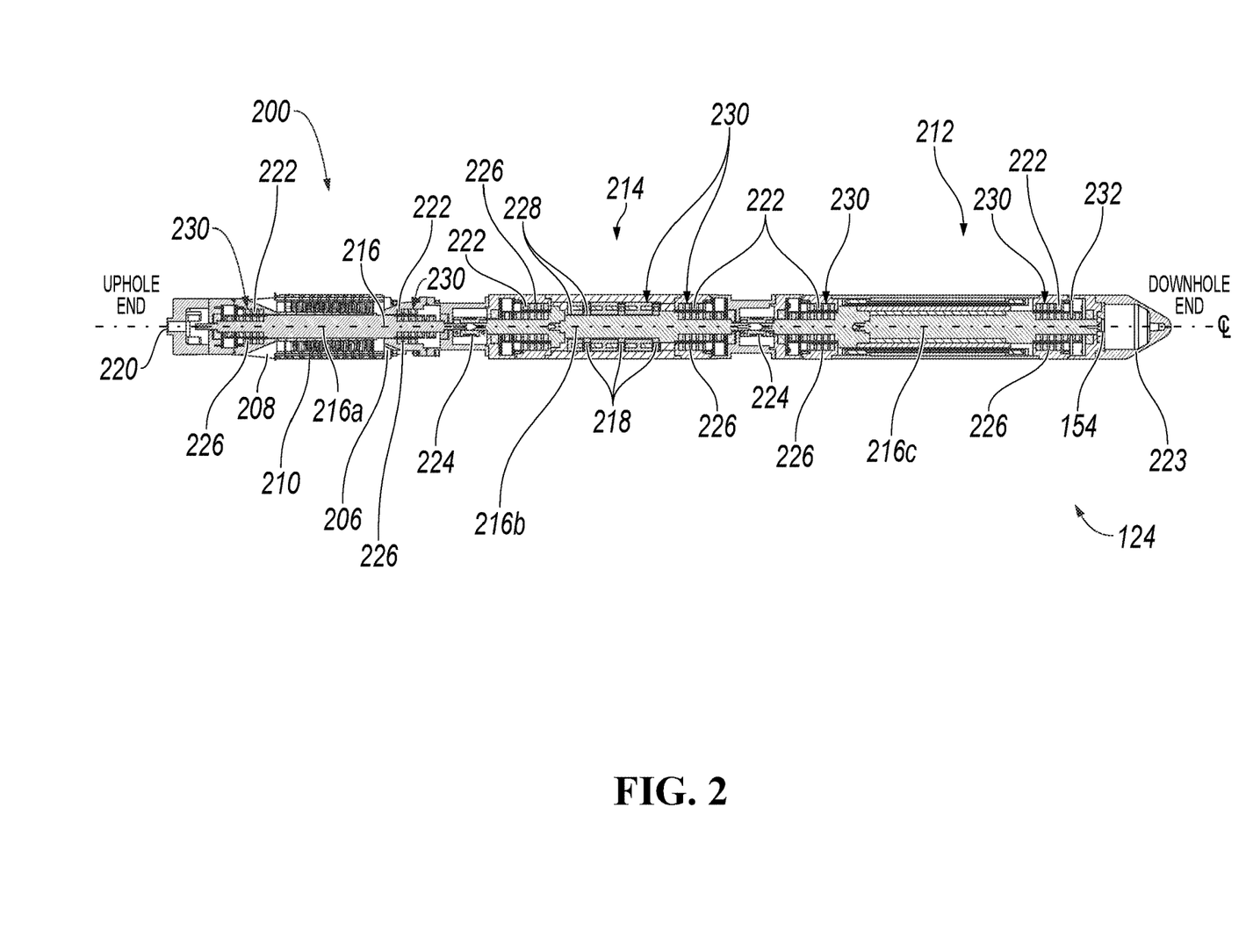
FIG. 2 is a schematic side half cross-sectional view of an example downhole-type system.

The downhole system, shown as the downhole-type system 124 is shown schematically in FIG. 1. FIG. 2 is a half side cross-sectional view of the example downhole-type system 124. Referring to both FIGS. 1 and 2, the example downhole-type system 124 includes a blower 200 and an electric machine 212. As mentioned previously, the downhole-type system 124 can include in addition to or instead of the blower 200, another type of rotating equipment, such as a pump (e.g. an electrical submersible pump). In the context of this disclosure, an uphole end or direction is an end nearer or moving in a direction towards the surface 106. A downhole end or direction is an end nearer of moving in a direction away from the surface 106. A coupling 220 is positioned at an uphole end of the blower 200. The coupling can be of a type used for a wireline connection, a tubing connection, or any other connection configured to support the weight of the downhole-type system. The coupling 220 can include a standard attachment method to attach the blower 200 to a support system. For example, a threaded interface can be used for sucker rod, or a set of bolts can be used to attach two flanges together for production tubing. The blower 200 includes an inlet 206 to receive a gas at the first pressure downhole of the blower 200 and an outlet 208 to output the gas at the second, higher pressure uphole of the blower 200. The inlet 206 can include a filter to limit particle sizes above a certain threshold from entering the downhole-type system 124. A cylindrical outer housing 210 houses an impeller in fluid communication with the inlet 206 to receive the gas from the wellbore 104 at the first pressure downhole of the blower 200 and to drive the gas to the outlet 208 at the second, higher pressure uphole of the blower 200. The inlet 206 includes a series of holes evenly spaced around the circumference of the housing 210 and oriented in a downhole trajectory. The outlet 208 includes a series of holes evenly spaced around the circumference of the housing 210 and oriented in a uphole trajectory. With the system 124 residing in the wellbore 104, the inlet 206 is at a downhole end of the blower 200 and the outlet 208 is at an uphole end of the blower 200. At a downhole end of the system 124 is a conical tip 223. The conical tip 223 reduces the pressure drop across the system 124. In some implementations, the conical tip 223 can house electronics that can be used in aspects of operation of the system 124 or for sensors. In some instances, the system 124 can be positioned in the well with the downhole inlet 206 positioned adjacent to the perforations 114 in the wellbore 104. For example, the blower 200 can be positioned in the wellbore 104 such that the inlet 206 is disposed next to and immediately uphole of the perforations 114 to maximize or improve the fluid flow from the perforations into the blower 200. In some examples, the inlet 206 may not be adjacent to perforations 114, such as the inlet 206 being positioned greater than about twenty feet away from the perforations 114. In some instances, a speed of the blower 200 is adjusted based on the fluid flow from the subterranean zone into the wellbore 104 (e.g., via perforations 114). For example, as the fluid flow from the subterranean zone into the wellbore 104 decreases, a speed of the blower 200 can increase to draw more fluid flow from the subterranean zone into the wellbore 104.

As previously described, the downhole-type system 124 moves the fluid from the downhole inlet 206 at the first pressure to the uphole outlet 208 at the second, higher pressure. This pressure differential promotes the fluid flow to move uphole of the system 124, for example, at a higher flow rate compared to a flow rate in a wellbore without a blower. The blower 200 can operate at a variety of speeds, for example, where operating at higher speeds increases fluid flow, and operating a lower speeds reduces fluid flow. In some instances, the impeller of the blower 200 can operate at speeds up to 120,000 revolutions per minute (rpm). In some instances, the impeller of the blower 200 can be run at lower speeds (e.g., 10,000 rpm). For the downhole-type system 124 illustrated in FIGS. 1 and 2, the maximum operating speed is 60,000 rpm. Specific operating speeds for the downhole system are defined based on the fluid, pressures and flows for the well parameters and desired performance. Speeds may be as low as 10,000 rpm or as high as 120,000 rpm. While the downhole system has an optimal speed range at which it is most efficient, this does not prevent the downhole system from running at less efficient speeds to achieve a desired flow for a particular well, as well characteristics change over time.

FIG. 2 further illustrates a blower 200, an electric machine 212, and a thrust bearing module 214 of the downhole-type system 124. The electric machine 212, the thrust bearing module 214, and the blower 200 are all coupled together on a central shaft 216. The electric machine 212 is configured to rotatably drive or be driven to generate electricity by the blower 200. The central shaft 216 can be levitated and axially supported by active magnetic thrust bearing assemblies 218 located in the thrust bearing module 214 as the central shaft 216 rotates. Magnetic radial bearing assemblies 222 can radially levitate and support the central shaft 216. The magnetic radial bearing assemblies 222 are shown as including passive magnetic radial bearings, but the assemblies 222 can instead include active magnetic radial bearings or a combination of passive and active radial magnetic bearings. While one of each electric machine 212, thrust bearing module 214, and blower 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and blower 200 module from downhole to uphole is shown, each module functions independently and can be placed in other orders that best suit the operation and integration of each module. Additionally, while a blower 200 is shown, this can be replaced with a compressor, a liquid pump, a mul-tiphase pump, or a combination thereof that best suits the fluids and conditions of the well to maximize well performance. In addition, the use of active magnetic thrust bearing assemblies 218 can be seen as one example of such an implementation of magnetic bearings, where active radial bearings can be used instead of or in addition to, in any case to enhance the downhole system performance. Active magnetic bearings can be used to maintain levitation along at least one axis. In other words, the active magnetic bearings can be used to maintain axial levitation of the rotatable central shaft 216, radial levitation of the rotatable central shaft 216, or both.

In some implementations, an active damping circuit 232 can be included. The active damping circuit 232 uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for operation. The active damping circuit 232 is able to adjust the magnetic field sufficiently enough to reduce vibration, but does not have the power to significantly affect the lifting or support characteristics of the bearing. In some implementations, the active damping circuit 232 acts as a generator that generates power when the axial gap decreases and thus powers a control coil to increase the levitating force. Thus, a sensor or an outside power source/controller is not necessary. This approach can also be used for the longitudinal axis, where a sense coil output sensing axial motion is amplified and fed to a damping to coil to react against the rotor field to resist motion.

The active magnetic thrust bearing assembly 218 and the magnetic radial bearing assembly 222 can fully support the central shaft 216 with one or more electromagnetic fields. That is, the central shaft 216 is not physically coupled the outer housing 210 during normal operation; there is no physical connection between the central shaft 216 and the outer housing 210. In other words, the shaft is spaced apart from the housing 210 and any associated mechanism connected to the housing 210 with a radial gap between the central shaft 216 and the housing 210.

In the illustrated implementation, the electric machine 212 is positioned downhole of the blower 200. The illustrated implementation also shows the active thrust bearing assembly resides between the electric machine and the blower. In some instances, the blower 200, the thrust bearing module 214, and the electric machine 212 can be assembled in a different order. For example, the thrust bearing module 214 can be positioned downhole of the electric machine 212 or uphole of the blower 200.

In FIG. 2, the central shaft 216 comprises multiple sub-sections coupled together: a blower rotor 216a, a thrust bearing rotor 216b, and an electric rotor 216c. Each subsection is joined together by a coupling 224. The coupling 224 can be a bellows, quill, diaphragm, or other coupling type that provides axial stiffness and radial compliance. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the blower 200, the thrust bearing module 214, and the electric machine 212.

The use of magnetic bearings allows for a seal-less design. That is, the surface of the blower rotor 216a, the thrust bearing rotor 216b, and the electric rotor 216c need not be sealed from and can all be exposed to the production fluid. As no mechanical bearings are used in the downhole-type system, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. There is a fluid path through the active magnetic bearing assemblies 218 that allow fluid to flow through an "air-gap" 226 in each of the bearings. More specifically, the active magnetic thrust bearing assemblies 218 have gaps 228 between a bearing housing 230 and the central shaft 216. The gap is unsealed and is of sufficient size to allow fluid flow through the active magnetic thrust bearing assembly 218. The gaps 228 can be annular fluid gaps that are not simply exposed to the process fluid flowing through the downhole-type system 124, but the process fluid is actively flowed through the gaps 228. The magnetic radial bearing assemblies 222 include one or more gaps 226 between a bearing housing 230 and the central shaft 216, and such process fluid flow (that is, through the gaps 228) allows for cooling of, for example, the rotor 216 and the bearing assemblies 222.

The radial bearing gaps 226 and the thrust bearing gaps 228 are sufficiently large to allow particulates to pass through without causing damage to rotating or stationary components. For example, in the illustrated implementation, an air-gap between the central shaft 216 (e.g., permanent magnet rotor 216c) and a stator of the electric machine 212 receives the fluid during operation of the downhole-type system 124. That is, an air-gap between the permanent magnet rotor 216c and the electric stator of the electric machine receives the fluid during operation of the electric machine. The bearings do not require seals as there is no physical contact between the rotor 216 and the outer case 210. In other words, the central shaft 216 is spaced apart from the outer housing 210 and is not mechanically connected to the outer housing 210.

In some instances, the following method can be used in conjunction with one or more implementations described within this disclosure. A working fluid, such as a production fluid, is flowed through a downhole-type device, such as the electric machine 212 positioned in the wellbore 104. The downhole-type device can include a rotor and a stator (such as the rotor 216c and the stator 210c shown in FIG. 5). The rotor is supported within the stator, and the stator is spaced from the rotor such that an annular fluid gap is defined in-between. The fluid gap is in fluid communication with an outside environment exterior the downhole-type device, and the working fluid is flowed through the annular fluid gap.

Figure 3:
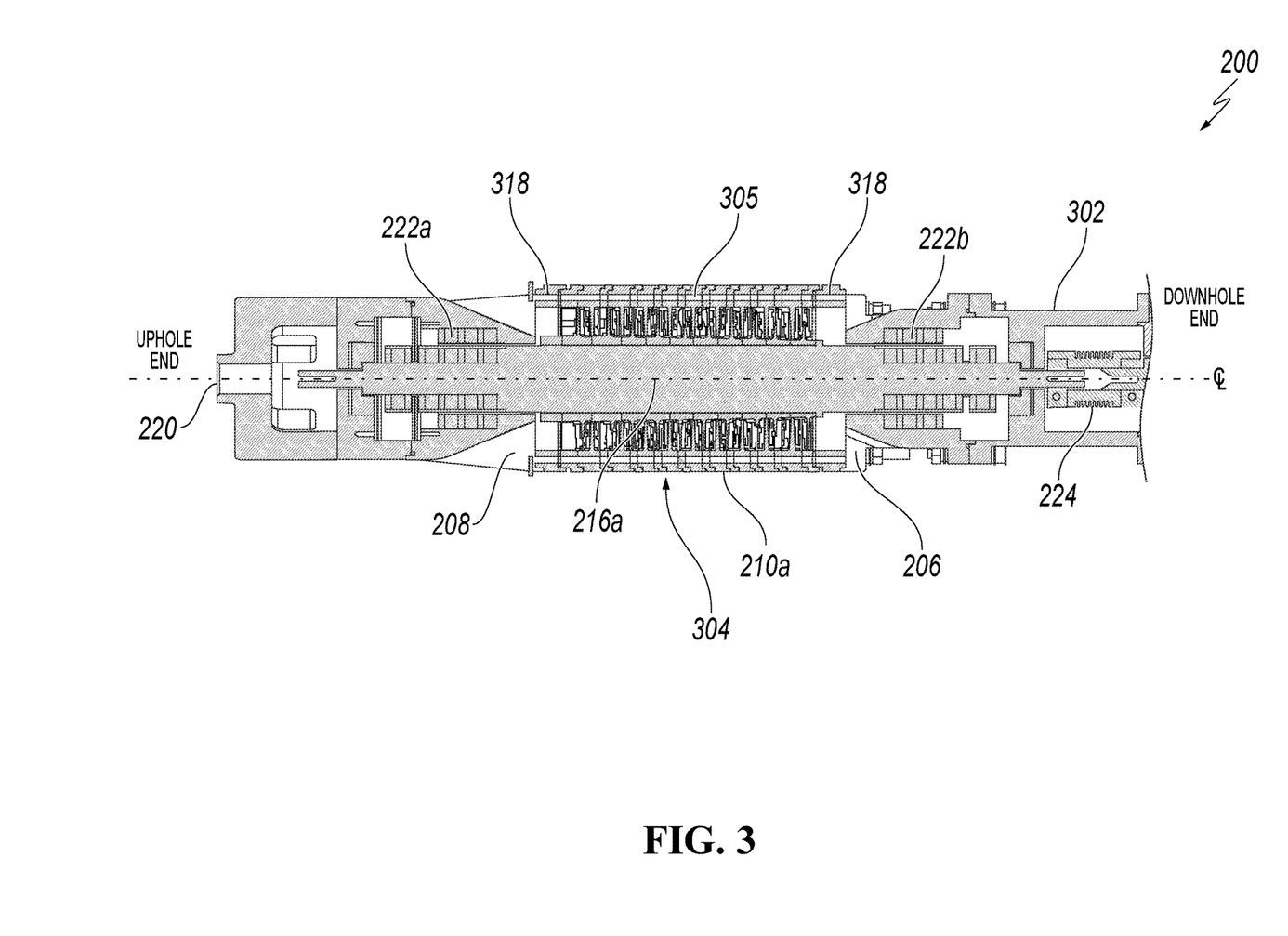
FIG. 3 is a schematic side half cross-sectional view of an example blower module of the downhole-type system in FIG. 2.

FIG. 3 is a detailed, half cross-sectional view of the blower 200. While the blower 200 is referred to as a blower in this disclosure, the blower 200 can also be configured to move liquid and act as a pump, or any combination of liquid and gas. In the illustrated implementation, the blower 200 is coupled to an uphole end of the thrust bearing module 214 by the coupling 224 and a coupling housing 302. The blower rotor 216a is axially supported and levitated by the thrust bearing module (not shown). In the illustrated implementation, a first magnetic radial bearing 222a supports a first end of the blower rotor 216a relative to a concentrically surrounding blower stator 210a. The first magnetic radial bearing 222a radially levitates and supports a first end of the blower rotor 216a. In some implementations, a second magnetic radial bearing 222b is used to support a second end of the blower rotor 216a relative to the surrounding pump stator 210a. The second magnetic radial bearing 222b radially levitates and supports a second end of the blower rotor 216a.

In some implementations, such as the implementation shown in FIG. 3, the blower 200 includes a blower rotor 216a and a blower stator 216a. The blower rotor 216a, as illustrated, is an axial fan with blades radiating out from a central axis. The blades are configured to drive or be driven by a production fluid in the wellbore. The blower stator 210a includes stator vanes radiating in towards a center axis. The stator vanes are configured to direct fluid flow to increase the efficiency off the blower 200. The rotor vanes and the stator vanes interface without contacting one another while the blower rotor 216a is rotating. As illustrated, the blower 200 includes a segmented blower stator 210a that includes multiple axially stacked, assembled together segments 304, stacked against one another. The stacked-stator implementation has several benefits, particularly during assembly. Assembling stacked stator segments 304 one piece at a time significantly reduces weight during each assembly step. Such a process allows the rotor to be completed independent of the stator, where the stator stages are then built around the rotor for a simplified and lower cost build process. Any adjustment for alignment can be determined as the stages are stacked via shims to ensure the unit is aligned with rotor to stator blade clearances for optimal performance.

In FIG. 3, each stator segment 304 is configured to stack against one another with a stator segment lip that centers each stator segment 304 once stacked. The stator segments 304 are held together by one or more stator bolts 305. Each stator segment has one or more bolt holes 318 near the outer edge of the stator segment that allows the stator bolt 305 to pass though the stator segment 304. In FIG. 3, the stacked stator segments 304 can define the outer housing 210 of the blower 200.

In some implementations, the blower rotor 216a can also include multiple rotor segments that are designed to stack against one another. In some implementations, the blower rotor can 216 can include a central portion that is configured to retain blades. In some implementations, torque can be transferred to or from the blower rotor 216a through the coupling 224. The coupling 224 can be a bellows, quill, diaphragm, or other coupling type that provides axial stiffness and radial compliance. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. The coupling 224 transmits torque and axial forces and movement from one shaft to the other while allowing for radial misalignment between the shafts. Such axial movement may be experienced due to thermal growth during operation. As illustrated, the coupling 224 connects the downhole end of the blower rotor 216a to an uphole end of the thrust bearing module 214.

Figure 4:
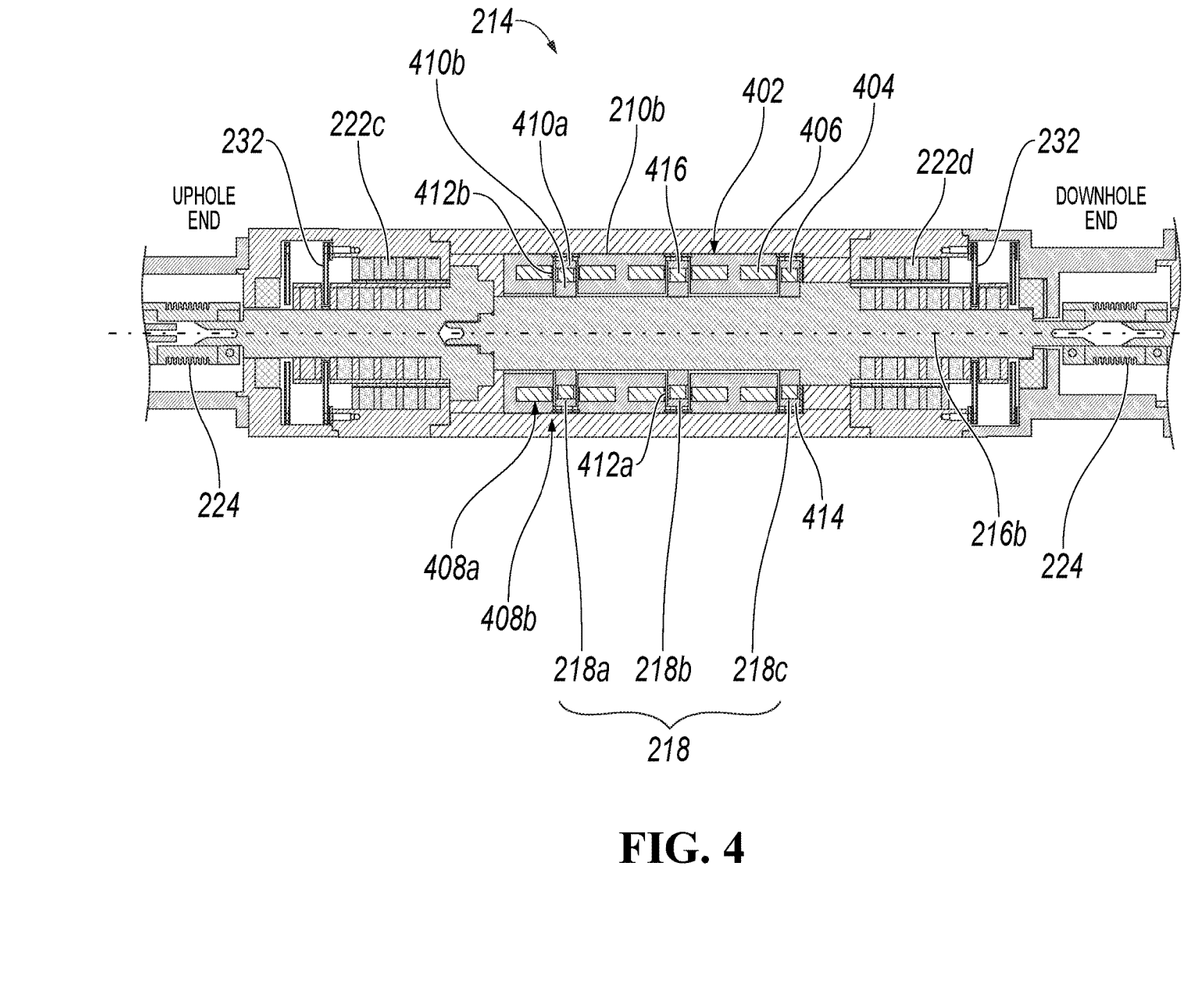
FIG. 4 is a schematic side half cross-sectional view of an example thrust bearing module of the downhole-type system in FIG. 2.

FIG. 4 is a side cross-sectional view of an example thrust bearing module 214. The thrust bearing module 214 includes one or more active magnetic thrust bearings 218 support a central rotor 216 (bearing rotor 216b) to a surrounding stator 210b. The active magnetic thrust bearing 218 is configured to levitate and support a central rotor 216 axially within an outer housing 210 (surrounding stator 210b). Active radial bearings 222c and 222d are configured to levitate and support a central rotor 216 radially within an outer housing 210. An active damping circuit 232 is included and is configured to damp radial vibration within the central rotor. Axial vibrations are mitigated with the active magnetic thrust bearings 218, or with an additional axial damping circuit (not shown).

The thrust bearing module 214 compensates for any axial loads and hold the axial position of the multiple module rotors by applying force to the rotor to maintain position. As loads are developed from the act of compressing or pumping fluids, the thrust bearing controller 160 reads the sensed position movement of the rotor from a target set point. The controller 160 then increases the current (by the amplifier 158) to the magnetic thrust bearings 218 that is converted to force on the rotor. This force is determined based on the amount of displacement sensed and the rate of change in motion using the specific control approach set by the controller 160. The thrust bearing 218 with sensor 154, controller 160, and amplifier 158 is thus able to compensate for forces on the rotor and apply corresponding off-setting forces to keep the rotor in an axial centered position. While a permanent magnet on the rotor configuration is shown, various configuration of thrust bearing could be applied, including all electric or alternative permanent magnet configurations.

As illustrated, the thrust bearing module 214 allows for non-magnetic spacers 414 to be used at the rotor outer diameter for setting stator axial position and for locking the split stator assemblies 402. Opposite polarity permanent magnets 404 are used on the rotor 216b to allow for coil wrapping of one or more back-to-back stator cores 406 to reduce overall bearing size and make assembly possible in split stator halves (i.e. both use the same coil). The outer housing, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the stator poles 408a are radially offset from the rotor poles 410b. With the restricted rotor outer diameter limiting the rotor pole size, the stator pole offset increases the cross section of the stator poles 408a, which increases the capacity of the thrust bearing 218, increasing bearing capacity without increasing overall bearing size.

The polarity for these cores 406 as it applies to each opposite pole face is opposite of one another. Each back to back core 406 is split in half to form two 180-degree assemblies. The coils in each of these 180-degree (semicircular) assemblies are wrapped from one side to the other, and results in opposite coil polarity on each side of the core 406. This in conjunction with the permanent magnets 404 on the rotor 216b having opposite polarity works to minimize size and simplify integration (coils that are split do not need to be routed to the outer diameter where they take up additional room and do not aid in generating bearing force). A third magnetic radial bearing 222c supports and levitates the bearing rotor 216b to the bearing stator 210b. A fourth magnetic radial bearing 222d supports and levitates the bearing rotor 216b to the bearing stator 210b.

The illustrated implementation (FIG. 4) shows a three bearing module with a first thrust bearing 218a, a second thrust bearing 218b, and a third thrust bearing 218c. Lift can be imparted on the rotor with coil current in one direction, and lift can be reduced or reversed with coil current in the opposite direction. The number of thrust bearings in a module can be one or more, depending on size, integration, rotodynamics, and other design considerations.

The bearing module 214 includes a rotor outer pole 410a. The rotor outer pole 410a is a magnetic steel pole that is magnetically acted upon by the stator pole 408a to produce force on the rotor 216b. The rotor outer pole 410a acts to conduct a permanent magnet field and a coil generated magnetic field and acts as the primary containment of the permanent magnet 416 onto the rotor for high speed operation. In some implementations the rotor outer pole 410a is secured with an interference fit on an inner diameter of the rotor outer pole 410a to the permanent magnet ring 416.

A rotor inner pole 410b is a magnetic steel pole that is magnetically acted upon by the stator pole 408a to produce force on the rotor 216b. The rotor inner pole 410b acts to conduct the permanent magnet field and the coil generated magnetic field. The rotor inner pole 410b is the primary connection point to the shaft 216 (rotor 216b) with which the thrust bearing forces are applied to the shaft 216.

A radially magnetized permanent magnet ring 416 is a permanent magnet material that provides magnetic field that the thrust bearing 218 uses to distribute to stator poles 408a on each side of the rotor 216b, thus energizing each gap between rotor pole and stator pole. The permanent magnet field provides roughly half of the maximum field designed for the stator poles 408a and rotor poles 408b, where this level allows for linear current load response from the bearing. The permanent magnet ring 404 is radially magnetized to provide a uniform polarity field to the outer poles and inner poles. With the use of multiple thrust bearings 218, the polarity of these rotor permanent magnets 404 changes from one to the next to allow for opposite coil polarity in double stator poles.

A rotor seal can 412a is a ring that covers the permanent magnet 404 sides and is welded or otherwise sealed to the metal outer and inner poles to prevent process fluids from contacting the permanent magnet and degrading performance. The cans 412a can be metallic, and nonmagnetic, but could also be made of a non-metallic material, such as Peek or ceramic.

A thrust bearing stator pole 408a is a stator pole that includes a magnetic steel material that conducts the permanent magnet flux and electromagnet coil flux for energizing the pole air gaps that result in forces on the rotor 216b. The thrust bearing stator poles 408a are secured to the housing to transmit forces relative to the outer housing 210.

A thrust bearing coil (wound around the core 406) is an electromagnet coil that is a wound coil with electronic insulation to take currents from the magnetic bearing controller and convert these to magnetic field in the thrust bearing 218. In some implementations, the thrust bearing coil can be made of copper.

A thrust bearing stator seal can 412b is a ring that covers the electromagnet coil sides and is welded or otherwise sealed to the metal outer and inner poles to prevent process fluids from contacting the electromagnet coil and affecting performance. The cans 412b can be metallic, and nonmagnetic, but could also be made of a non-metallic material, such as Peek or ceramic.

A stator pole spacer 414 is a spacer that includes nonmagnetic steel pieces and is used to set the relative position of two stators or a stator and housing to locate the stator poles in relation to the housing 210. A double stator pole is split in two halves for assembly. These stator poles include two halves that use two coils. The coils wrap 180 degrees on one side and then are routed to the other side where they wrap 180 degrees back and route back to where they started to form a complete loop. This coil winding, along with polarizing the rotor magnets opposite for each subsequent rotor, allows for utilizing the complete coil loop for a split stator pole. As such the two poles are combined for minimum space necessary.

In some instances, position sensors are included for an active magnetic bearing, such as for the thrust bearings 218, and can use conventional inductive, eddy current, capacitive, or other types of sensors. These position sensors can be isolated from the environment or exposed (that is, submerged) in the downhole (process) fluids. With conventional sensors, electronics could be installed downhole in the device or at a topside facility with sensor downhole.

The position sensors can include a position sensitive generator, such as an axial gap generator, that can produce a voltage proportional to the axial gap that can be used to determine axial position. This offers a high voltage output that can be transmitted over long distances to minimize line drop and noise issues. Multiple approaches can be used to achieve a sensor downhole for the thrust bearing system, but all are unique in how they are integrated into the system to meet the operating environment. The position sensors (154) are described in more detail later.

Figure 5:
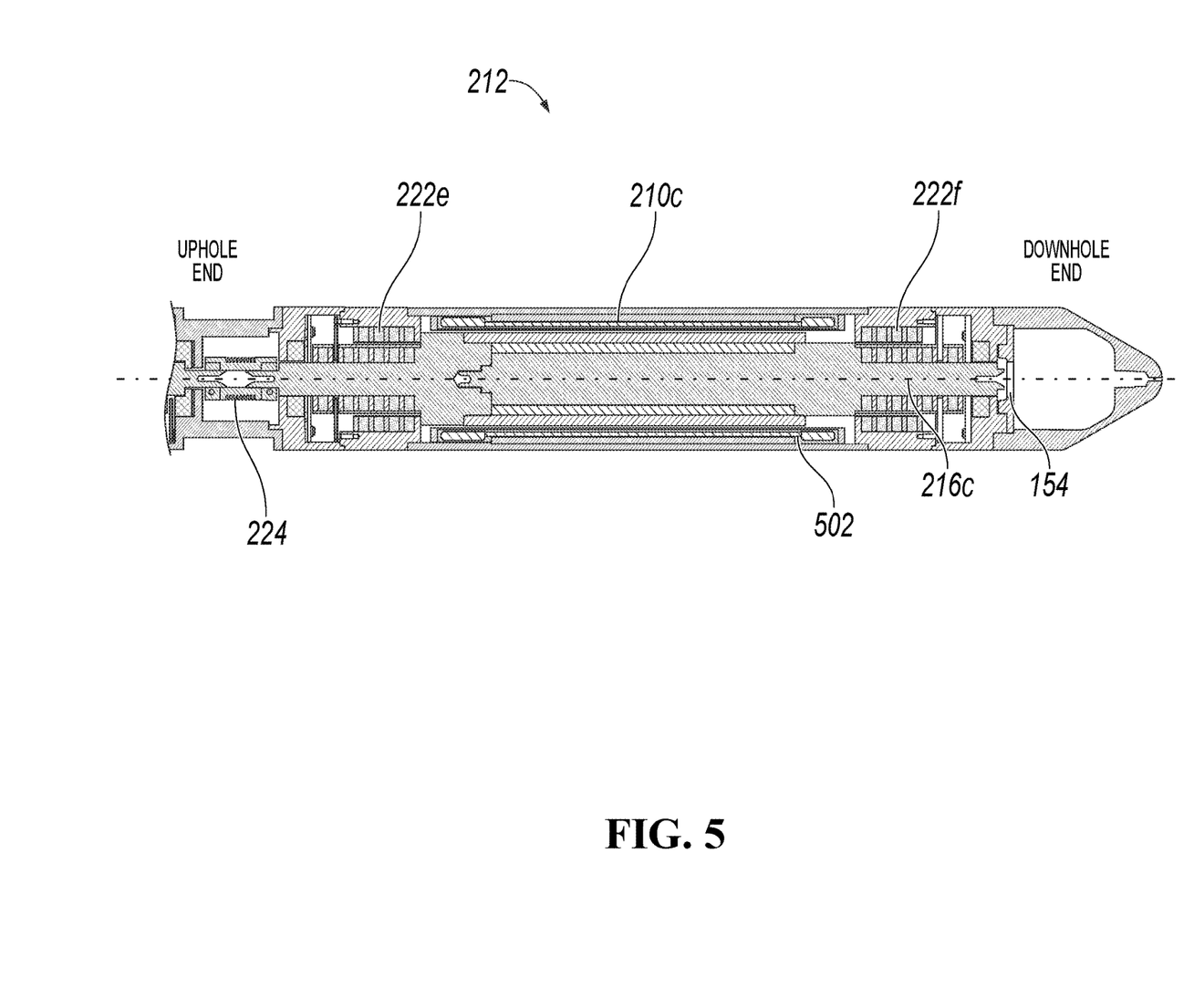
FIG. 5 is a schematic side half cross-sectional view of an example electric machine module of the downhole-type system in FIG. 2.

FIG. 5 is a half cross-sectional schematic diagram of the electric machine 212 that can be used with aspects of this disclosure. In the illustrated implementations, the electric machine 212 is coupled to a downhole end of the thrust bearing module 214 (not shown). The electric machine 212 is configured to either drive or be driven by the blower rotor 216*a* (not shown) to generate electricity. The electric machine 212 includes a permanent magnet rotor 216*c* that is axially levitated and supported by the thrust bearing module 214. The permanent magnet rotor 216*c* is coupled to the thrust bearing rotor 216*b* by a coupling 224. The coupling 224 can be a bellows, quill, diaphragm, or other coupling type that provides axial stiffness and radial compliance. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. An electric stator 210*c* surrounds the permanent magnetic rotor 216*c*. The electric stator includes electric coils 502. An active magnetic radial bearing 222*e* supports and levitates the permanent magnet rotor 216*c* to the electric stator 210*c*. Another active magnetic radial bearing 222*f* supports and levitates the permanent magnet rotor 216*c* to the electric stator 210*c*. As the permanent magnet rotor is axially supported by the thrust bearing module 214 for the downhole-type system 124, no thrust bearing is needed within the electric machine 212. In some cases (although not shown), a downhole-type system does not include separate thrust bearing module 214 that includes all of the magnetic thrust bearings 218, but one or more magnetic thrust bearings 218 are included in the system and distributed across the various modules of the system (such as within the blower 200 or the electric machine 212). The stator 210*c* is canned using a metallic or non-metallic sleeve on the inner diameter of the stator 210*c*. The can is sealed, by welding for example, at each end and supported from any well pressure by the stator and/or potting behind the sleeve to insure it does not deform during operation. Multiple electric machines 212 can be connected in series to produce more power if needed.

The electric machine 212 is controlled by a high frequency variable speed drive (VSD) from the surface. Variable frequency or speed allows the electric machine 212 drive to rotating the device at a speed optimal for well production. It also allows for one drive to be used at many well sites where performance in speed and power vary. While sensored drives could be used, bringing sensor signals to the surface over long distances presents many challenges, including cables and connectors in addition to having the actual sensor and their associated electronics installed in the system. The downhole-type system 124 uses a sensor-less VSD capable of long distance (>500 meters) electric machine 212 control. This sensor-less VSD monitors the speed of the electric machine 212 and is able to maintain speed or torque control of the electric machine 212 to ensure it operates as desired. The VSD is also capable of interpreting the machine parameters to provide operating data on motor temperature and fluid properties, such as density, for example.

Cables connect the topside VSD to the downhole electric machine 212, transmitting the low voltage (<600 VAC) or medium voltage (<10,000 VAC) from the VSD to the electric machine 212. For longer distances higher voltage is desired to reduce current losses in the cable and reduce cable size. Reductions in cable size reduce cable cost and cable weight, though require higher class of electrical insulation on the cable. In cases where the controller system 150 is packaged for deployment downhole, cooling is required to maintain the controller 160 within an allowed operating temperature range. Cooling can be provided with a heat sink that distributes any generated heat to a surrounding process fluid, for example, by a finned heat plate made of metal or a thermoelectric cooling plate. Power supplied by cables from the surface can be used by the controller 160 and by the cooling system, or power can be supplied by the VSD, which also drives the electric machine 212. In some implementations, the variable frequency power from the VSD can be converted into a steady voltage DC to power the controller 160 and any other system deployed downhole. In some implementations, a separate generator can be provided to provide power to the controller 160 and any other system deployed downhole. The separate generator can be configured to operate once the rotor begins to rotate. In some implementations, the controller 160, while deployed downhole within the wellbore, is closer to a zone of cooler process fluid (for example, uphole of the electric machine 212), which can provide an additional cooling effect to the controller 160.

The thrust bearing module 214 compensates for any axial loads and hold the axial position of the multiple module rotors by applying force to the rotor to maintain position. As loads are developed from the act of compressing or pumping fluids, the thrust bearing controller system 150 senses position movement of the rotor from a target set point. The controller system 150 can include sensors 154, sensor demodulation electronics, a controller 160 (using a digital signal processor or analog control approach), an amplifier 158, and associated power supplies. The controller 160 then increases the current to the magnetic bearing that is converted to force on the rotor. This force is determined based on the amount of displacement sensed and the rate of change in motion using the specific control approach set by the controller 160. The thrust bearing 218 with controller 160 is thus able to compensate for forces on the rotor and apply corresponding off-setting forces to keep the rotor in an axial centered position. While a permanent magnet on the rotor configuration is shown, various configuration of thrust bearing could be applied, including all electric or alternative permanent magnet configurations.

The sensor 154 is configured to detect a position of the rotatable shaft in a downhole location and to generate (at the downhole location) a first signal based on the detected position. For example, the downhole end of the rotor 216c can have a flanged end (not shown), and the sensor 154 can sense the gap (that is, the distance) between the sensor 154 and the flanged end of the rotor 216c to determine an axial position of the shaft 216. Although shown in FIGS. 2 and 5 as being located within the electric machine 212 (the driver of the downhole-type system 124), the sensor (or multiple sensors) can be located at other locations along the shaft 216, as long as there is a calibrated set point to compare the axial position of the shaft 216 with a desired position of the shaft 216. In some implementations, the sensor 154 includes a converter configured to convert the first signal (sometimes referred as the position signal) into a transmittable analog signal or a transmittable digital signal. The sensor 154 can include a generator and a converter. The generator of the sensor 154 can be configured to generate a voltage signal based on a detected position of the rotor. The converter of the sensor 154 can be configured to convert the voltage signal into a digital signal. In some cases, the voltage signal generated by the sensor 154 is an AC voltage signal. The converter of the sensor 154 can be configured to convert the AC voltage signal into a DC voltage signal.

Figure 6:
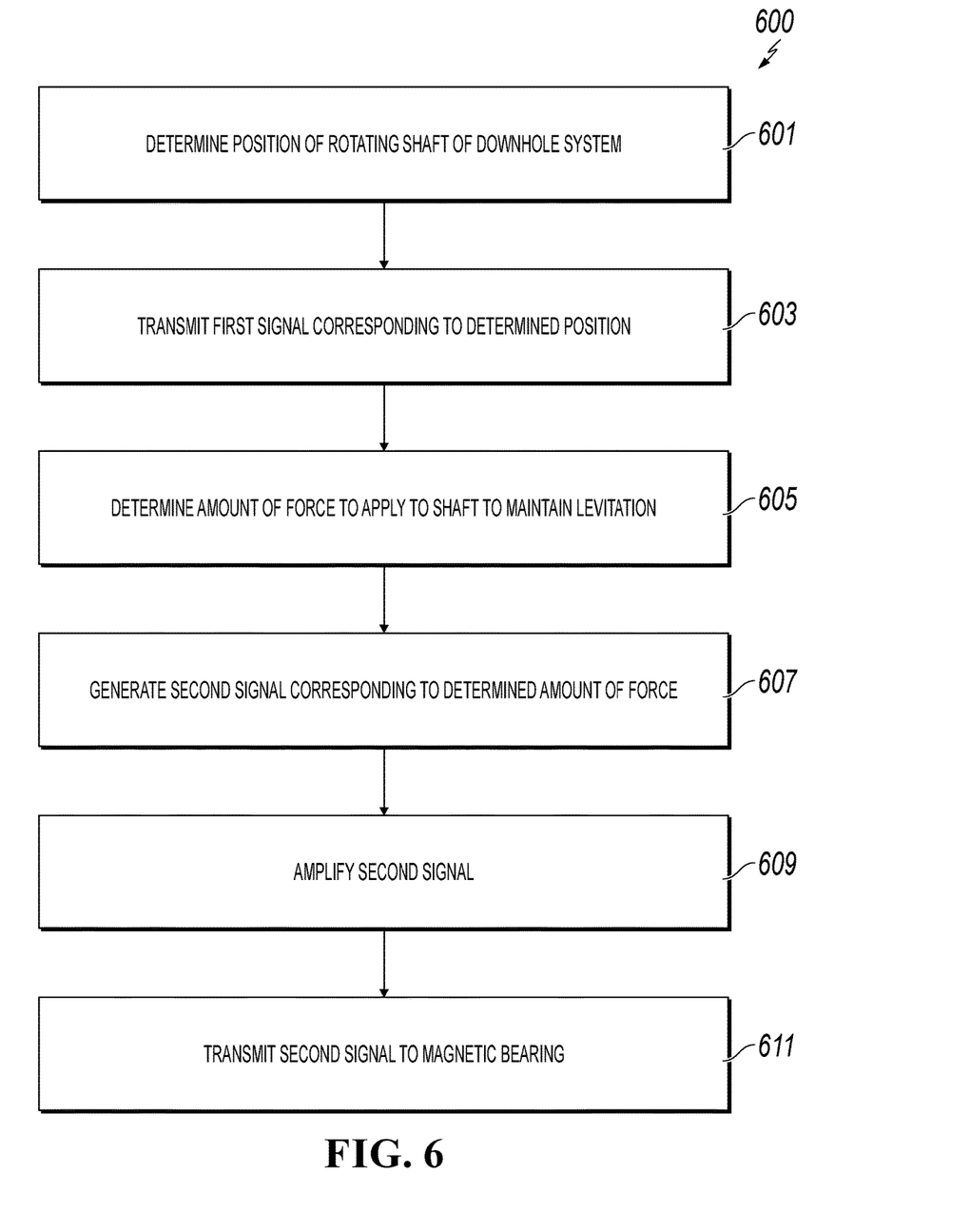
FIG. 6 is a flow chart of an example method for maintaining a position of a shaft of a downhole-type system.

The components described previously within this disclosure can be used to implement the example method 600 shown in FIG. 6. The method 600 can be considered a control loop to operate the active magnetic bearings. The control loop can occur quickly, for example, on the order of every 10 microseconds. At 601, a position of a rotating shaft of a downhole system is determined at a downhole location. The rotating shaft is levitated by one or more magnetic bearings. The one or more magnetic bearings maintain levitation of the rotating shaft in one or more axes. The one or more magnetic bearings maintain axial levitation of the rotating shaft, radial levitation of the rotating shaft, or both. The downhole location can be more than 500 meters (m) away from the surface. The shaft can be centrally positioned within a stator comprising an electric machine with active radial magnetic bearing assemblies coupled to the shaft and the stator. The shaft can be axially supported with an active magnetic thrust bearing assembly coupling the shaft and the stator. The shaft can be rotated within the stator positioned within a wellbore. The position of the rotating shaft (the rotor) can be determined by a sensor, such as an inductive, eddy current, capacitive, or any other sensor. In some cases, for example, when sensor electronics are located downhole while the controller is located at the surface, the first signal is a low voltage position signal that is converted to a digital signal that can be transmitted over a long distance (for example, a distance longer than 500 m) and be resistant to noise.

At 603, a first signal corresponding to the determined position of the rotating shaft is transmitted from the downhole location to a surface, for example, to the controller 160 at the surface 106. The first signal can be transmitted by the sensor at a rate on the order of a signal every 50 microseconds or faster. Transmitting the first signal can include generating a voltage signal based on the determined position of the rotating shaft and sending the voltage signal to the controller (such as the controller 160 located at the surface 106) across a connection, such as the wireline 128. Transmitting the first signal can additionally include converting the generated voltage signal into a digital signal. The first signal can be considered a position signal.

At 605, an amount of force to apply to the shaft to maintain levitation of the rotating shaft at the downhole location is determined at the surface based on the first signal. For example, the position of the rotating shaft is compared to a desired position, and an amount of force required to return the rotating shaft to the desired position (to maintain desired levitation of the shaft within the downhole-type system) is determined by the controller 160. As one example, a magnetic bearing can have a force constant of 100 pounds per amp of applied current. The controller 160 (for example, based on a programmed response to a sensor signal of 0.005 inches of rotor position deviation from the target position) can provide a signal to the amplifier 158, which amplifies the signal and provides 0.5 amps to the actuator of the magnetic bearing in order to apply 50 pounds of force to the shaft (rotor).

Adding a non-time varying force to the rotor is a simple example of responding to a static deflection in position. For example, the controller 160 can be programmed to ramp up the current quickly when a measured position is far from the target position, but as the measured position approaches the target position, the controller 160 can ramp slowly, so that the position of the shaft does not overshoot the target position. As the frequency or rate of change in position occurs, such as synchronous position movements due to an unbalance of the shaft as it rotates, the response of the controller 160 may be more complicated to effect stable rotor position control. As one example, the control approach can be a proportional-integral-derivative (PID) control, which is a method of determining the proportional, integral, and derivative responses based on sensor input and summing the responses (proportional, integral, and derivative) to determine a control output. The proportional component is dependent on error, that is, the difference between a setpoint and a measured value (such as the target position and the measured position, respectively). The integral component sums the error over time, allowing the response to increase over time to achieve a desired response (for example, returning to the target position). The derivative component is dependent on the rate of change of the sensor signal.

Continuing the earlier example, the proportional response first determines that the response to the displacement should be 0.5 amps. If the position does not change based on the next measured position signal received, the integral component increases the current response for the same (unchanged) displacement (and accordingly, the proportional response stays the same). On the next cycle (that is, receiving the next measured position signal), if the rotor position has changed significantly and is now 0.001 inches away from the target position (in which the proportional component would then correspond to a current of 0.1 amps), the derivative component only allows a current of 0.01 amps, due to the quick change in rotor position. The magnetic bearing system (together with the controller system 150) can operate continually to maintain the rotor position at the target position. The closeness of the rotor position to the target position can be affected by the level of control required by the system, the level of noise in the signals, and the forces acting on the rotor. Position control within 0.00001 inches are typical for high-precision magnetic bearing systems, but control within 0.005 inches or more can be acceptable for other applications.

At 607, a second signal corresponding to the determined amount of force is generated at the surface, for example, by the controller 160. At 609, the second signal is amplified to a level that is sufficient to drive the magnetic bearing to control the levitation of the rotatable shaft at the downhole location. The controller 160 can be programmed to include a model of predicted response of the amplifier 158 and can account for cable effects on the current signal before the signal reaches the magnetic bearing. Such models can be created and programmed as part of the response of the controller 160 to ensure the level of the signal being sent is high enough to reach the magnetic bearing located downhole. The second signal can be amplified, for example, by the amplifier 158 at the surface 106. In some cases, the second signal is filtered in order to compensate for capacitance and/or inductance present in a transmission cable carrying the second signal, for example, from the amplifier 158 to the magnetic bearing (such as the magnetic thrust bearing 214). The second signal can be filtered to compensate for any cable-related alterations of the amplifier drive current, which may include both hardware (located topside or downhole) and software corrections.

At 611, the amplified second signal is transmitted to the magnetic bearing located at the downhole location. As mentioned previously, the second signal can be filtered before the second signal is transmitted to the downhole location in order to optimize the second signal reaching the magnetic bearing. The second signal can be an electric current that drives the magnetic bearing. The magnetic bearing can include an actuator (surrounding the rotating shaft) that generates a magnetic field in response to receiving an electric current (that is, the second signal). The magnetic bearing can include a target (also surrounding the rotating shaft) that imparts a force on the rotating shaft in response to the magnetic field generated by the actuator. The force generated by the target can cause, for example, the relative position of the rotating shaft to be maintained within the downhole-type system along at least one axis of the rotating shaft (such as axial, radial, or both). The force can be generated by the actuator quickly, for example, within 50 milliseconds after transmitting the first signal (that is, the position signal from the sensor).

While some examples of the subject matter have been disclosed, aspects of this disclosure can describe other implementations. For example, in some implementations, the central shaft rotates at a sub-critical speed below a first harmonic of the central shaft. In some implementations, the central shaft can include a single, continuous shaft. While the illustrated examples included two radial bearings within each module, a single radial bearing at an uphole end of the downhole-type system and at a downhole end of the downhole-type system (two total radial bearings) can provide adequate levitation and support. Active and/or passive damping systems can be used on the active magnetic bearings. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion. While a permanent magnet rotor was described in the context of the electric machine, an inductive rotor, can be used to similar effect.

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein with respect to a blower could also be applied to a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A downhole-type system comprising:
   a rotatable shaft;
   a downhole-type magnetic bearing coupled to the rotatable shaft, the magnetic bearing configured to control levitation of the rotatable shaft by applying force to the rotatable shaft;
   a downhole-type sensor configured to:
      detect a position of the rotatable shaft in a downhole location, and
      generate, at the downhole location, a first signal based on the detected position;
   a surface-type controller configured to:
      receive, at a surface, the first signal generated by the sensor,
      determine, at the surface, an amount of force to apply to the shaft to maintain levitation of the shaft, and
      generate, at the surface, a second signal corresponding to the determined amount of force; and
   a surface-type amplifier coupled to the magnetic bearing, the amplifier configured to:
      receive, at the surface, the second signal from the controller,
      amplify, at the surface, the second signal to a sufficient level to drive the magnetic bearing to apply force to the rotatable shaft to control the levitation of the rotatable shaft at the downhole location, and
      transmit, to the downhole location, the amplified second signal to the magnetic bearing.

2. The system of claim 1, wherein the sensor and the magnetic bearing are lubricant-free.

3. The system of claim 1, wherein the downhole location is more than 500 meters (m) away from the surface.

4. The system of claim 1, wherein the magnetic bearing is configured to control axial levitation of the rotatable shaft.

5. The system of claim 1, wherein the magnetic bearing is configured to control radial levitation of the rotatable shaft.

6. The system of claim 1, wherein the magnetic bearing is configured to control levitation of the rotatable shaft along one axis of the rotatable shaft.

7. The system of claim 1, wherein the magnetic bearing is configured to control levitation of the rotatable shaft along a plurality of axes of the rotatable shaft.

8. The system of claim 1, wherein the system is configured to operate during rotation of the shaft.

9. The system of claim 1, wherein the sensor and the magnetic bearing are configured to be submerged in fluids present in the downhole location.

10. The system of claim 1, wherein the sensor is one of an inductive sensor, an eddy current sensor, and a capacitive sensor.

11. The system of claim 1, wherein the sensor is configured to generate and transmit the first signal at a rate on the order of a signal every 50 microseconds or faster.

12. The system of claim 11, wherein the sensor comprises a converter configured to convert the first signal into one of a transmittable digital signal and a transmittable analog signal.

13. The system of claim 1, wherein the magnetic bearing comprises:

an actuator surrounding the shaft, the actuator configured to generate a magnetic field in response to receiving an electric current; and a target surrounding the shaft, the target configured to impart a force on the shaft in response to the generated magnetic field.

14. The system of claim 13, wherein the sensor and the actuator of the magnetic bearing are not sealed from the downhole location.

15. The system of claim 1, wherein the sensor comprises a generator configured to generate a voltage signal based on the detected position.

16. The system of claim 15, wherein the sensor comprises a converter configured to convert the voltage signal into a digital signal.

17. A method comprising:
determining, at a downhole location, a position of a rotating shaft of a downhole-type system, the rotating shaft levitated by a magnetic bearing;
transmitting, from the downhole location to a surface, a first signal corresponding to the determined position;
determining, at the surface, an amount of force to apply to the shaft to maintain the levitation of the rotating shaft at the downhole location;
generating, at the surface, a second signal corresponding to the amount of force;
amplifying, at the surface, the second signal to a sufficient level to drive the magnetic bearing to control the levitation of the rotatable shaft at the downhole location; and
transmitting, to the downhole location, the amplified second signal to the magnetic bearing.

18. The method of claim 17, further comprising filtering the second signal to compensate for capacitance and inductance in a transmission cable.

19. The method of claim 17, wherein the magnetic bearing maintains axial levitation of the rotating shaft.

20. The method of claim 17, wherein the magnetic bearing maintains radial levitation of the rotating shaft.

21. The method of claim 17, wherein the magnetic bearing maintains levitation of the rotating shaft along one axis of the rotating shaft.

22. The method of claim 17, wherein the magnetic bearing maintains levitation of the rotating shaft along a plurality of axes of the rotating shaft.

23. The method of claim 17, wherein the downhole location is more than 500 m away from the surface.

24. The method of claim 17, wherein transmitting the first signal occurs at a rate on the order of a signal every 50 microseconds or faster.

25. The method of claim 17, further comprising:
generating a magnetic field in response to receiving an electric current; and
generating a force on the shaft in response to the generated magnetic field.

26. The method of claim 25, wherein generating the force occurs within 50 milliseconds after transmitting the first signal.

27. The method of claim 17, wherein transmitting the first signal comprises generating a voltage signal based on the determined position.

28. The method of claim 27, wherein transmitting the first signal comprises converting the generated voltage signal into a digital signal.

* * * * *